US007852650B2

(12) United States Patent
Taylor et al.

(10) Patent No.: US 7,852,650 B2
(45) Date of Patent: Dec. 14, 2010

(54) SELECTABLE LINE VOLTAGE INVERTERS AND ASSOCIATED METHODS

(75) Inventors: William Fillmore Taylor, Bend, OR (US); Brian John Hoffman, Bend, OR (US); Alexander Faveluke, Wilsonville, OR (US)

(73) Assignee: PV Powered, Inc., Bend, OR (US)

( * ) Notice: Subject to any disclaimer, the term of this patent is extended or adjusted under 35 U.S.C. 154(b) by 118 days.

(21) Appl. No.: 11/872,677

(22) Filed: Oct. 15, 2007

(65) Prior Publication Data
US 2008/0180976 A1 Jul. 31, 2008

Related U.S. Application Data

(60) Provisional application No. 60/851,633, filed on Oct. 13, 2006.

(51) Int. Cl.
*H02P 13/06* (2006.01)
*H02M 7/537* (2006.01)
*H01F 29/04* (2006.01)

(52) U.S. Cl. ........................ 363/100; 323/340; 336/150; 363/131

(58) Field of Classification Search ................ 323/255, 323/340; 363/100, 131, 135, 137, 142; 336/137, 336/145, 146, 150
See application file for complete search history.

(56) References Cited

U.S. PATENT DOCUMENTS

| 3,636,489 | A | * | 1/1972 | Colangelo et al. | 336/94 |
|---|---|---|---|---|---|
| 3,792,395 | A | * | 2/1974 | Michel | 336/5 |
| 4,541,040 | A | * | 9/1985 | Allfather | 363/37 |
| 4,608,531 | A | * | 8/1986 | Stephens | 324/73.1 |
| 4,694,241 | A | * | 9/1987 | Genuit | 323/340 |
| 5,777,396 | A | * | 7/1998 | Kikuchi | 307/112 |
| 5,825,164 | A | * | 10/1998 | Williams | 323/255 |
| 5,905,624 | A | * | 5/1999 | Andreica et al. | 361/144 |
| 5,999,430 | A | * | 12/1999 | Aritsuka | 363/95 |
| 6,128,204 | A | * | 10/2000 | Munro et al. | 363/41 |
| 7,199,489 | B2 | * | 4/2007 | Gottlieb et al. | 307/66 |
| 2002/0044473 | A1 | * | 4/2002 | Toyomura et al. | 363/142 |

* cited by examiner

*Primary Examiner*—Jeffrey L Sterrett
*Assistant Examiner*—Fred E Finch, III
(74) *Attorney, Agent, or Firm*—Perkins Coie LLP

(57) ABSTRACT

An inverter capable of supplying power to utility grids of varying line voltages is described. In some examples, the inverter contains multiple output taps that are selected to output power to the utility grid based on the voltage of the utility grid. In some examples, the inverter includes a multi-pin connector that connects with one of multiple receptacles associated with a desired voltage configuration. In some examples, the inverter is capable of adapting to a defined line voltage in two steps.

6 Claims, 5 Drawing Sheets

SELECTABLE LINE VOLTAGE INVERTERS AND ASSOCIATED METHODS

CROSS-REFERENCE TO RELATED APPLICATION(S)

This application claims the benefit of U.S. Provisional patent application No. 60/851,633, filed on Oct. 13, 2006, entitled SELECTABLE LINE VOLTAGE INVERTER, which is hereby incorporated by reference in its entirety.

BACKGROUND

The solar energy industry is expanding at a rapid pace. Much of this expansion is the result of an increase in residential and commercial photovoltaic (PV) arrays that convert light into electrical power. Although PV arrays can be connected to a power utility grid, PV arrays output direct current (DC) power, and utility grids require the input of alternating current (AC) power because they provide AC power. As a result, a power inverter is typically used to convert the DC power supplied by the PV array into the AC power input required by the utility grid.

Typical Inverters use power electronics to convert DC power to AC power and provide a number of safety and user interface features. Conventional inverters are manufactured to be used with utility grids at specifically defined line voltages (such as 120 volt, 208 volt, 240 volt, 480 volt, and so on). Thus, distributors need to stock inverters for each line voltage in order to meet the needs of their customers. Furthermore, a customer may mistakenly order an inverter with an incompatible line voltage and therefore have to return it, which can be burdensome and costly to the distributor and/or the customer.

DETAILED DESCRIPTION

A. Overview

Figure 1A:
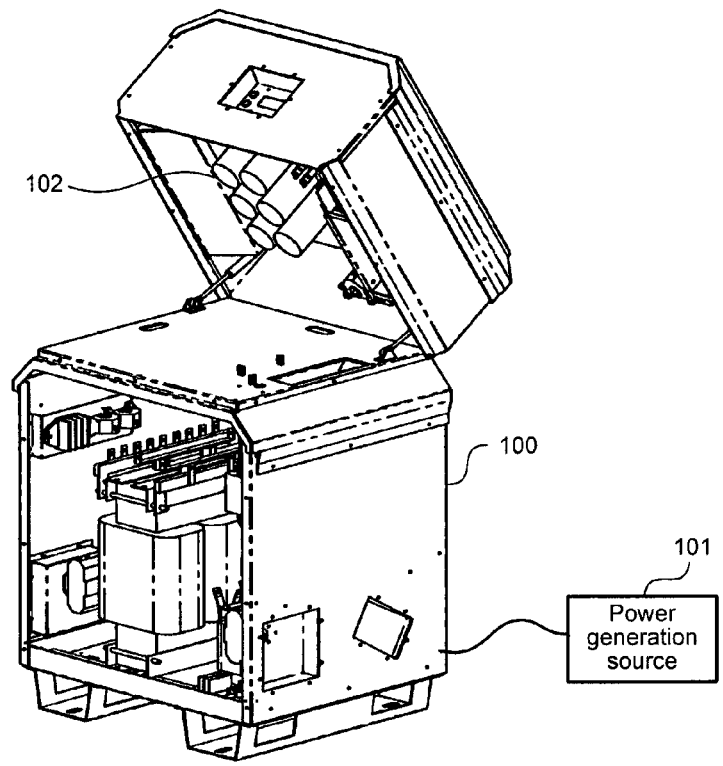
FIG. 1A is a diametric view of an inverter and a depiction of a power generation source in accordance with several embodiments of the disclosure.

The present disclosure is directed generally to power inverters capable of being connected to different line voltages. Several embodiments of the disclosure describe selectable line voltage inverters that include switching mechanisms to enable a user to change the line voltage for the inverter. According to several embodiments of the disclosure, a user can switch the line voltage of a single inverter in two steps. These two steps may accomplish four separate functions that are generally required when switching or changing the line voltage of an inverter. These four functions include: (1) setting a voltage range flag in control logic, (2) changing a voltage sensing range, (3) changing input taps on a control power transformer, and (4) changing taps on a main power transformer.

In some embodiments, the voltage range flag, the voltage sense range and the control power transformer taps are each changed by moving a single multi-pin adaptor from one receptacle to another. The main power transformer is configured by moving three individual wires, one on each of the three phases. Thus, by moving a single multi-pin adapter and the individual wires, the inverter can be capable of functioning at any set voltage.

According to several embodiments of the disclosure, the inverter may require an AC power source (e.g., typically 120V) to energize a small switching power supply. The main transformer, however, may be disconnected from the utility grid before the inverter begins operation for protection, compliance and/or efficiency reasons. Thus, in these cases control power does not come from the main transformer and a small auxiliary multi-tap single phase transformer may supply the control power. The auxiliary transformer can include windings that allow 208 volt, 240 volt or 480 volt connections. When the input voltage is changed, these windings can be switched to the corresponding voltage.

Several embodiments of the disclosure are implemented within a processor (such as a CPU) of an inverter. For purposes of energy metering and control, the CPU needs to know what level of voltage is input to the inverter. In these cases, digital input switching can be used to determine and relay the voltage level to the inverter CPU. For example, the digital input can be pulled high or low by a switch, relay or jumper.

According to several embodiments of the disclosure, a single, free-hanging, multi-pin connector is used to input in the AC power of the utility grid. The connector may combine the features of analog scaling, auxiliary transformer winding energization and digital input switching, all within one connector block. The connector may be connected by wires to an input line, and may plug into one of three mating connectors on a circuit board. The combination of this board and the wiring on the free-hanging connector accomplishes the analog scaling, auxiliary transformer winding energization and digital input switching. The combination enables the use of one connector that can be placed at one of three locations, according to the corresponding voltage, rather than requiring multiple jumpers or switches to be activated to configure the inverter for the desired voltage range as is used in conventional inverters.

In several embodiments of the disclosure, the multi-pin connector connects to the input line. When the multi-pin connector is connected into a lower voltage connection, the input lines are attached to the midpoint of a high voltage resistor string in a voltage sense circuit. When the multi-pin connector is connected into a higher voltage connection, the input lines are attached to the end of a high voltage resistor string in a voltage sense circuit. Thus, more resistance is provided to the circuit for a high voltage selection than a low voltage selection. The additional resistance provides a larger ratio between the input voltage and the output voltage when applied to sense resistors or an amplifier configuration on the other end of the resistor string. Also, an additional connector may connect the other end of the resistor string to an external circuit board. The selectable connection points provide easily adjustable scaling for all input lines. These connection points also offer the benefit of maintaining approximately equal voltages for all ranges at the connection point to the external board sense circuitry. Thus, the wiring and circuitry of the external board sense circuitry can be designed for a single voltage rating.

Several embodiments of the selectable line voltage inverters described herein can provide a marketing advantage to suppliers because a manufacturer or distributor may stock and deliver these inverters without knowing what line voltage a present or future customer requires, among other benefits. This minimizes the storage and required stocking of the inverters and can also prevent an inverter from getting shipped back for reasons of line voltage incompatibility.

Specific details of several embodiments of the disclosure are set forth in FIGS. 1-5 and the following description and to provide a thorough understanding of these embodiments. A person skilled in the art, however, will understand that the disclosure may be practiced without several of these details or additional details can be added to the disclosure. Moreover, several details describing well-known structures or processes often associated with inverters are not shown or described below in detail to avoid unnecessarily obscuring the description of the embodiments of the disclosure. Where the context permits, singular or plural terms may also include the plural or singular term, respectively. In addition, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Furthermore, the term "comprising" is used throughout to mean including at least the recited feature(s) such that any greater number of the same feature or additional types of features are not precluded.

B. Embodiments of Selectable Line Voltage Inverters and Associated Methods

Several embodiments of the present disclosure relate to a three phase inverter designed to operate at multiple distinct voltage levels, (e.g., 208 volt, 240 volt, 480 volt, and so on). In a conventional inverter, there are typically multiple operations that need to occur to cause an inverter to operate at a different set point voltage. For example, in several embodiments of the present disclosure there are four such operations, namely: switching input lines on a primary transformer, switching input lines on a power supply transformer, changing resistance values of a voltage divider on a volt sense circuit, and changing a flag notifying a control logic component (e.g., analog, CPU, DSP, etc.) of the present operating voltage so that appropriate software will be executed. These embodiments accomplish the four operations in minimal steps, namely that all four of these tasks can be accomplished in only two steps. FIG. 1A illustrates inverter 100 which can be configured to operate at various line voltages with minimal exertion. As shown, inverter 100 is configured to receive power from power generation source 101 and includes conversion subsystem 102 that is configured to receive DC power from power generation source 101, to convert the received power to AC power, and to supply the AC power to a utility grid.

Figure 1B:
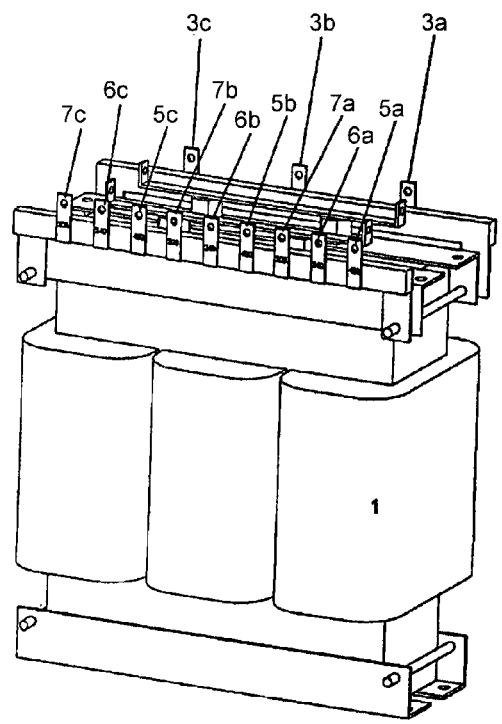
FIG. 1B is an isometric side view of a transformer in accordance with several embodiments of the disclosure.

Several embodiments of the inverters disclosed herein use transformers to change internal voltage to utility line voltage. The degree of change is dependent on the number of windings in the transformer coils, which can be altered by changing taps on a multiple tap transformer. FIG. 1B is an isometric side view of a multi-tap transformer 1 that converts power output from inverter power electronics to a utility line voltage. Power electronics, such as insulated gate bipolar transistors (IGBT), can be used to switch a DC power source at high frequency to create a semblance of an AC sinusoidal wave form. The voltage from the IGBT is determined in part by the voltage of the incoming DC source. The most efficient output voltage, however, may not be the same as that of the utility voltage to which the inverter is connected. By providing a primary transformer 1 with multiple input taps, a single voltage output from the inverter power electronics can be stepped up or down to match any connected voltage.

In several embodiments, three sets of taps are provided that step the output voltage to 208 volts, 240 volts, and 480 volts. For example, the transformer 1 has a set of output taps 3 from which power flows to a utility grid (optionally passing through an inductor and/or other filtering components and appropriate safety switches). In the Figure, multiple input taps are also provided. For example, a set of low voltage taps 5, a set of mid voltage taps 6, and a set of high voltage taps 7 are provided. The designation of low, mid, and high voltage of these input taps 5, 6, 7 refers to the voltage created at the output taps 3 since the voltage at any of the three sets of input taps 5, 6, 7 will be substantially similar. Because inverter 1 is a three phase device, each of the taps 3, 5, 6 7 is individually designated with 'a', 'b,' or 'c' to signify phases A, B and C respectively. Of the three sets of input taps 5, 6, 7, the low voltage input taps 5 are connected to the most windings thus producing the lowest AC voltage at the output taps 3 for a given input AC voltage. The high voltage input taps 7 are connected to the smallest number of winding and thus produce the highest AC voltage at the output taps 3 for a given input AC voltage. The mid voltage input taps 6 are connected to an intermediate number of windings and thus produce an intermediate AC voltage at the output taps 3 for a given input AC voltage. For example, the inverter may use the taps to output voltages of 208 volts, 240 volts and/or 480 volts.

Changing the taps on the transformer is the first of two steps required to adjust the voltage output of the inverters described herein. Additionally, several embodiments can provide multiple output taps on a transformer and accomplish similar benefits as those discussed with respect to the multi-tap inverter configurations. Although it may be possible to combine the changing of input taps with the other functions described herein, combining any of the three other steps with the changing input taps step on a transformer may be undesirable in cases where the power levels associated with the connections are of different scales.

Figure 2:
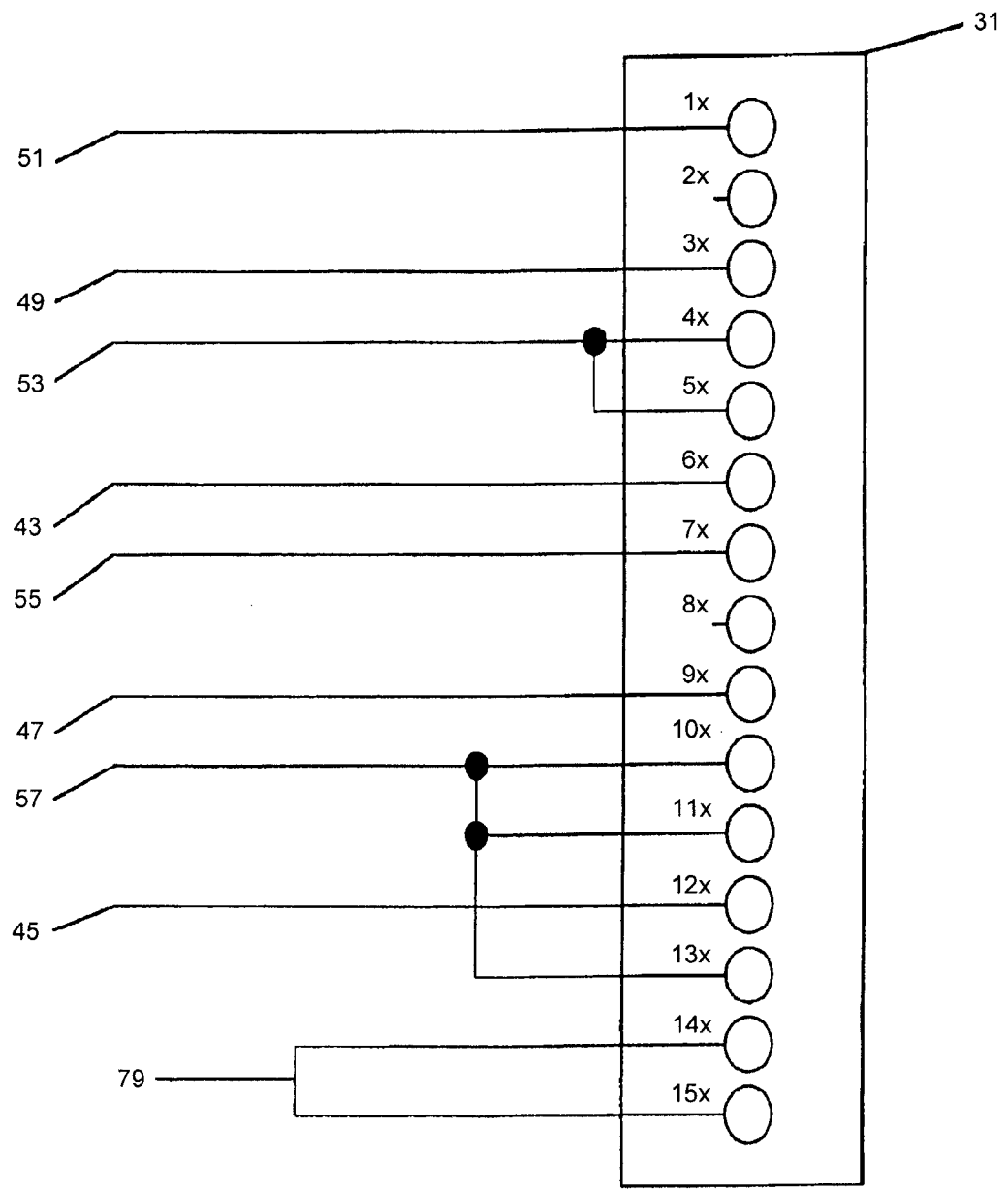
FIG. 2 is a schematic diagram of a free hanging connector in accordance with several embodiments of the disclosure.

In several embodiments, the second step involved in changing the voltage output of an inverter includes placing one multi-pin connector at or into an appropriate receptacle. FIG. 2 is a schematic diagram of a multi-pin connector 31 (e.g., a free hanging connector) with associated leads in accordance with several embodiments of the disclosure. The Figure shows fifteen pins connections 1x-15x. However, one or ordinary skill will appreciate that more or fewer pin connections could of course be implemented.

Figure 3:
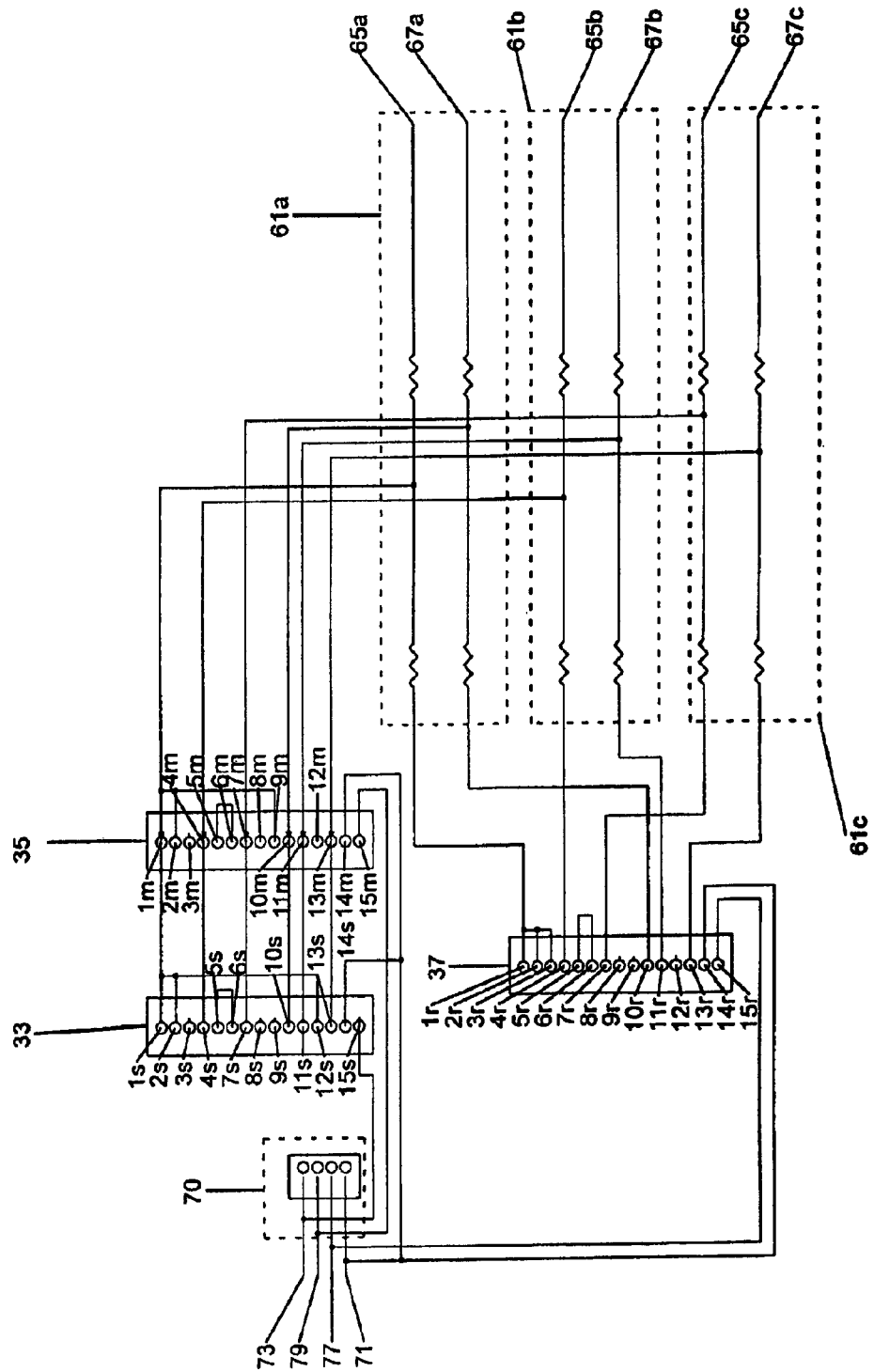
FIG. 3 is a schematic diagram of three multi-pin receptacles fixed on a single circuit board in accordance with several embodiments of the disclosure.

FIG. 3 is a schematic diagram of three multi-pin receptacles fixed on a single circuit board in accordance with several embodiments of the disclosure. The three receptacles include: a low voltage receptacle 33, a mid voltage receptacle 35 and a high voltage receptacle 37, each of which can be at a fixed position on the circuit board. Referring to both FIGS. 2 and 3, the low voltage receptacle 33 includes pin connections 1s-15s that can optionally join with the mating pin connections 1x-15x of the multi-pin connector 31. The mid voltage receptacle 35 includes pin connections 1m-15m that can optionally join with the mating pin connections 1x-15x on the multi-pin connector 31. The high voltage receptacle 37 includes pin connections 1r-15r that can also join with the mating pin connections 1x-15x on the multi-pin connector 31.

The multi-pin connector 31 may be placed in the low voltage receptacle 33, mid voltage receptacle 35, or high voltage receptacle 37 to select 208 volt, 240 volt, or 480 volt operation, respectively. In some embodiments, all three multi-pin receptacles 33, 35, 37 may be placed on a single circuit board.

By connecting the multi-pin connector 31 into the appropriate voltage receptacle 33, 35, 37, the remaining three operations of (1) switching input lines to a power supply transformer, (2) changing resistance values on a voltage divider on a volt sense circuit, and (3) changing a flag notifying a control logic of the present operating voltage are simultaneously performed in a single step.

In several embodiments, a power supply that provides 120 volts AC as well as various DC voltages to components of an inverter may affect some of the functions of the inverter. The source of power for an inverter power supply may be the line voltage, which may be at one of several voltage levels. For example, a small scale single phase multi-tap transformer 40 (shown schematically in FIG. 4) can provide 120 volt power to a power supply when the appropriate taps are switched.

Figure 4:
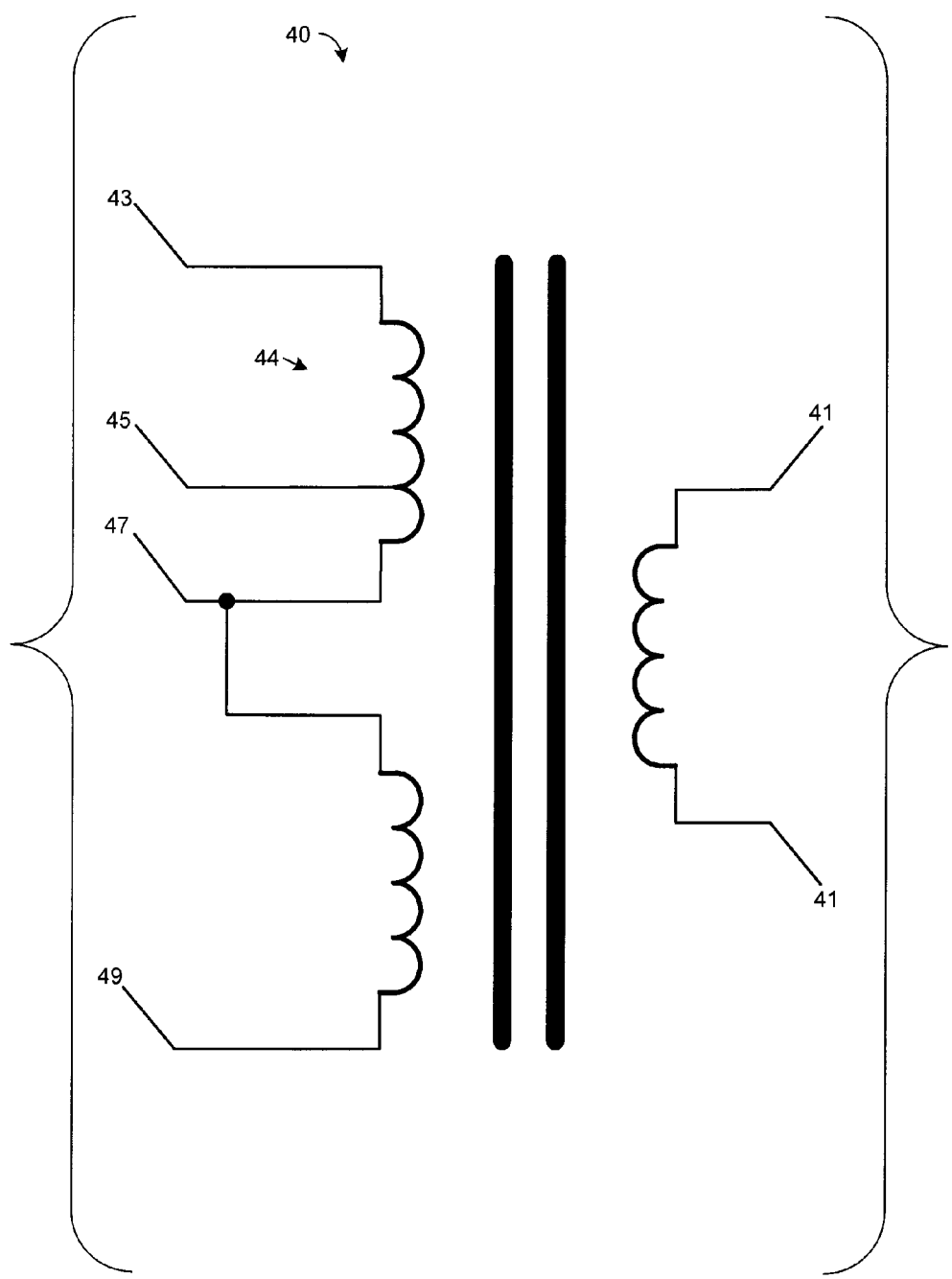
FIG. 4 is a schematic diagram of a power supply transformer in accordance with several embodiments of the disclosure.

FIG. 4 is a schematic diagram of a power supply transformer 40 in accordance with several embodiments of the disclosure. The transformer 40 can include input windings 44 to allow connection to different input AC voltages (e.g., 208 volts, 240 volts or 480 Volts). Output windings 41 can provide 120 volts AC to the power supply circuitry. Providing 120 volts AC may be accomplished by connecting one utility line to a common lead 43 of the input windings 44, and one line to a corresponding hot lead 45, 47, 49 of the input windings 44. In the Figure, the low voltage hot lead 45 corresponds to a 208 volt input, a mid voltage hot lead 47 corresponds to a 240 volt input, and a high voltage hot lead 49 corresponds to a 480 volt input. The power supply transformer input common lead 43 and each of the hot leads 45, 47, 49 is connected to the multi-pin connector 31. For example, as shown in FIG. 2, the input common lead 43 is connected to pin connection 6x, the low voltage hot lead 45 is connected to pin connection 12x, the mid voltage hot lead 47 is connected to pin connection 9x, and the high voltage hot lead 49 is connected to pin connection 3x.

In FIG. 3, three phase power lines from the utility grid are also connected to the multi-pin connector 31. For example, a utility line 51 is connected to pin connection 1x, a utility line 53 is connected to pin connection 4x and 5x, a utility line 55 is connected to pin connection 7x, and a utility neutral line 57 is connected to pin connections 10x, 11x, and 13x. Mating the multi-pin connector 31 to the appropriate receptacle 33, 35, 37 will connect utility line 53 to the power supply transformer 40 input common 43, and will also connect utility line 51 to the appropriate transformer input hot lead 45, 47, 49.

In several embodiments, when the multi-pin connector 31 is connected into the low voltage receptacle 33 in a circuit board, the circuit board provides a connection between utility line 53 and the power supply transformer common lead 43, via corresponding pin connections 5x and 5s, and 6s and 6x. A connection is also provided between utility line 51 and the low voltage hot lead 45 of the power supply transformer 40, via corresponding pin connections 1x and 1s, and 12s and 12x. Similarly, when the multi-pin connector 31 is connected into the mid voltage receptacle 35, the circuit board can provide a connection from utility line 53 and the power supply transformer common lead 43, via corresponding pin connections 5x and 5m, and 6m and 6x, and between utility line 51 and the mid voltage leads 47 of the power supply transformer 40, via corresponding pin connections 1x and 1m, and 9m and 9x. Also, when the multi-pin connector 31 is connected into the high voltage receptacle 37, the circuit board can provide a connection from utility line 53 and the power supply transformer common lead 43, via corresponding pin connections 5x and 5r, and 6r and 6x, and between utility line 51 and the high voltage leads 47 of the power supply transformer 40, via corresponding pin connections 1x and 1r, and 3r and 3x.

In several embodiments, the power supply transformer 40 draws power from only one phase of a three phase utility connection. This can be accomplished, for example, as line to line as shown the example above, or line to neutral. Further, the utility lines 51, 53, 55, 57 can be of low enough impedance that the draw from the power supply transformer 40 does not significantly alter the voltage on the lines as not to affect voltage sensing. Although the utility lines 51, 53, 55, 57 have low impedance, these lines may also need to be physically small enough to fit into a standard multi-pin connector 31. For example, the lines can be made of conductors of wire gauge ten to fourteen, or other gauges.

In several embodiments, the inverters disclosed herein have a direct connection to the utility line for voltage sensing purposes, which is independent of the main transformer's impedance under load. To accurately measure voltage, scaling techniques are frequently used with various meters or analog to digital converters (ADCs). This may be achieved using relays in high end voltmeters (e.g., auto ranging) or by a range selector switch. In some cases, measuring voltage of on-board ADCs may more difficult, however, because single chip parts have a limited resolution and can be affected by various sources of error in the hardware. Accordingly, a voltage sensing design can use analog scaling to change the raw line voltage to a voltage that makes full use of the input range of the sensing circuits. As such, in some cases different scaling can be used for each voltage input. For example, between 480 and 208 volts, more than one-half of the total resolution would be lost by using a single range that would accept 480V on the input.

For example, if the sensing circuit scaled 480 Vrms to +/−1 volt peak, then 208 Vrms would scale to +/−0.433 Volts. If 1 volt peak gives 512 bits of deflection, then 0.433 volts would give only 222 bits of deflection. Using a single sensing circuit measurement of a 480 volt signal would be as accurate as possible for the given hardware, but a measurement of a 208 volt signal would have less than half the resolution possible. Accordingly, by changing the scaling in the voltage sense circuit to use 512 bits of deflection to measure a 208V volt signal, the resolution of the voltage sensing can be more than doubled.

In several embodiments, there are two separate analog scalings using a series of resistors in voltage dividers. One scaling is for 208 volts and 240 volts, and the other scaling is for 480 volts. Combining ranges for the 240 volts and 208 volts provides simplicity despite a slightly less precise range for the 208 volt connection. In other embodiments, three separate scalings can be used for the 208 volts, 240 volts, and 480 volts in order to ensure precise ranges.

Figure 5:
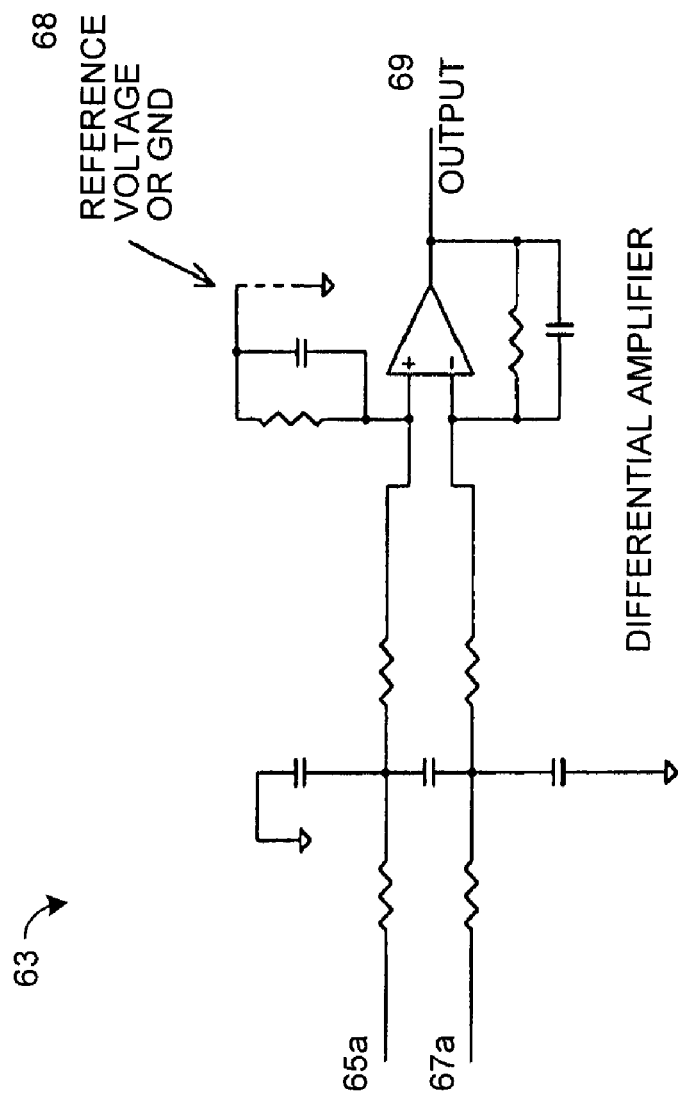
FIG. 5 is a schematic diagram of a voltage sensing circuit in accordance with several embodiments of the disclosure.

In several embodiments, there may be a voltage divider circuit for each line to line or line to neutral measurement. Each of the input lines may be monitored separately. Each voltage divider circuit may consist of two parts. For example, first parts 61a, 61b, and 61c of line to neutral voltage sense circuits for utility lines of power phases A, B, and C, respectively. FIG. 3 shows the first parts 61a, 61b, 61c of line to neutral voltage sense circuits for utility lines A, B, and C respectively. FIG. 5 is a schematic voltage sensing circuit in accordance with several embodiments of the disclosure. FIG. 5 shows a second part 63 of a voltage sense circuit measuring utility line to neutral voltage. Second part 63 provides the load to the rest of the circuit shown in FIG. 3. For example, the second part may include a differential amplifier that conditions the signals transmitted to the control logic, such as by scaling or providing references to ground, and so on. That is, the amplifier provides the loading for the resistor strings shown in FIG. 3. In other embodiments, substantially similar first and second part circuits 61, 63 can be used for measuring phase B utility line to neutral and phase C utility line C to neutral voltages. The second part of the circuit 63 may connect to the circuit 61 and various points, such as at 65a, 67a, 65b, 67b, 65c, 67c of FIG. 3. Additionally, circuit 63 may include a ground or reference voltage 68 and an output 69 to an ADC.

In several embodiments, the output of a first part 61 of a voltage sense circuit may be brought to an external circuit board by an additional connector. Having the first part 61 of a voltage sense circuit on the same circuit board as the receptacles 33, 35, 37 can connect different total resistance values in the first part 61 the voltage sense circuit corresponding to the different voltage levels of the receptacles 33, 35, 37. For example, in FIG. 3, the low and mid voltage receptacles 33, 35 are connected to the first part 61 of a voltage sense circuit with a certain resistance before going to the second part 63. The high voltage receptacle 37 is connected to the first part 61 of a voltage sense circuit such that the signal experiences greater resistance before going to the second part 63. Scaling the voltage sense signal in this manner offers the additional benefit of maintaining approximately equal voltages for both ranges at the connection point between the first part 61 the second part 63 of the voltage sense circuit. Thus, the wiring and circuitry of the second part 63 of the voltage sense circuit can be designed for a single sensor voltage rating.

As shown in FIG. 3, line to neutral sensing is used. In line to neutral sensing, a voltage sense circuit measures line phase A utility line to neutral, phase B utility line to neutral, and phase C utility line to neutral. The neutral line is subjected to the same resistor strings as the "hot" lines, and the neutral is connected to three points on the multi-pin connector 31. The connection points are pin connections 10x, 11x, and 13x shown in FIG. 2. Thus, the neutral line can be applied to three strings without providing a connection between those strings on the circuit board. An on-board connection between the strings in a location on the lines not previously connected to could cause voltage combination and pollute the measurements with information from the other lines. Accordingly, the three points of the neutral line on the multi-pin connector 31 allow three completely separate measurements for any selected range.

A similar configuration can be used in certain embodiments for line-to-line sensing of voltage as well. For example, in a three phase line to line sensing, each input utility line is brought to at least two connections on the multi-pin connector 31. These lines connect to the resistor string to apply phase measurements of A to B, B to C, and C to A. Similar to the case of the line to neutral sense scheme above, the two connections to each line should be joined on the multi-pin connector end of the connection. Thus, on the lower voltage setting the unused resistors carry no current and cause no effect on the circuit. On the higher voltage setting, however, each line is independently connected to the sensing circuitry by its own resistor string, thus preventing pollution between the other line's measurements.

In several embodiments, the inverter provides a configuration connection between two points within the control circuitry, which the control circuitry can monitor for connection. A signal flag alerts control logic as to the nominal operating voltage setting. In certain embodiments, a flag block 70 (e.g., see FIG. 3) may be operably coupled to the multi-pin receptacles 33, 35, 37. For example, a flag is set by connecting a flag ground 71 to an appropriate voltage flag, such as a low voltage flag 73, a mid-voltage flag 75, or a high voltage flag 77. The low, mid and high voltage flags 73, 75, 77 can correspond to 208 volts, 240 volts, and 480 volts respectively. Grounding one of the voltage flags 73, 75, 77 will inform the control logic as to the nominal operating voltage for the inverter. Flag ground is one of several examples of configuring by connection of monitored points. As such, the control logic can initiate the appropriate software or firmware for the corresponding voltage.

In certain embodiments, the multi-pin connector 31 includes a jumper wire 79 between pin connectors 14x and 15x (see, FIG. 2). Moreover, traces on the receptacle circuit board can connect the appropriate voltage flags 73, 75, 77 to the flag ground 71, depending on which receptacle contains the multi-pin connector 31. For example, referring to both FIGS. 2 and 3, if the multi-pin connector 31 is in the low voltage receptacle 33 (e.g., 208 volts), then the flag ground 71 is connected to the jumper wire 79 via a trace in the circuit board and pin connections 14s and 14x. The jumper wire 79 is then connected to the low voltage flag 73 via pin connections 15x and 15s with a trace in the circuit board. Therefore, when the multi-pin connector 31 is in the low voltage receptacle 33, the low voltage flag 73 is grounded and the control logic is informed that the inverter is configured for low voltage operation (e.g., 208 volts). Similarly when the multi-pin connector 31 is in the mid voltage receptacle 35 the mid voltage flag 75 is grounded and when the multi-pin connector 31 is in the high voltage receptacle 37 the high voltage flag 77 is grounded.

The description of specific embodiments herein is for demonstration purposes and in no way limits the scope of this disclosure to exclude other not specifically described embodiments of the present disclosure.

From the foregoing, it will be appreciated that specific embodiments of the disclosure have been described herein for purposes of illustration, but that various modifications may be made without deviating from the spirit and scope of the disclosure. For example, the multi-pin connector 31 may have other configurations than those illustrated in the Figures. Moreover, specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, embodiments of the disclosure are not limited except as by the appended claims.

We claim:

1. A method for setting a line voltage for an inverter connectable to a utility grid at a certain line voltage, the method comprising:
    moving a single multi-pin connector from a first receptacle to a second receptacle associated with the certain line voltage, wherein the moving the single multi-pin connector selects input taps of a control power transformer and connects the selected input taps to the utility grid;
    selecting three output taps of a main power transformer according to the certain line voltage; and
    connecting the selected output taps to the utility grid,
    wherein moving the single multi-pin connector to the second receptacle also changes a voltage range flag of the inverter, and changes a voltage sense range of the inverter.

2. The method of claim 1, wherein connecting the selected output taps configures a voltage output of the main power transformer of the inverter.

3. An inverter, comprising:
- a conversion module configured to convert direct current (DC) power to alternating current (AC) power of a selectable voltage and to supply a power line with the converted AC power; and
- a voltage selection module configured to power the conversion module and that includes a multi-pin connector and two or more receptacles, wherein each of the receptacles is coupled to different input taps of a control power transformer, wherein the multi-pin connector is configured to be coupled to one of the receptacles, and wherein the multi-pin connector and the two or more receptacles are configured to select the selectable voltage based on which of the two or more receptacles the multi-pin connector is coupled to,
- wherein coupling of the multi-pin connector to one of the receptacles establishes a connection between: (1) a digital ground and a digital input associated with a selected voltage, (2) an input line of the inverter and a position of a resistor string associated with the selected voltage to provide resistance within a circuit of the inverter.

4. An inverter, comprising:
- a conversion module configured to convert direct current (DC) power to alternating current (AC) power of a selectable voltage and to supply a power line with the converted AC power; and
- a voltage selection module configured to power the conversion module and that includes a multi-pin connector and two or more receptacles, wherein each of the receptacles is coupled to different input taps of a control power transformer, wherein the multi-pin connector is configured to be coupled to one of the receptacles, and wherein the multi-pin connector and the two or more receptacles are configured to select the selectable voltage based on which of the two or more receptacles the multi-pin connector is coupled to,
- wherein coupling of the multi-pin connector to one of the receptacles establishes a connection between a digital ground and a digital input associated with a selected voltage.

5. The inverter of claim 4, wherein coupling of the multi-pin connector to one of the receptacles establishes a connection between an input line of the inverter and a tap of the control power transformer, wherein the tap is associated with a selected voltage.

6. An inverter, comprising:
- a conversion module configured to convert direct current (DC) power to alternating current (AC) power of a selectable voltage and to supply a power line with the converted AC power; and
- a voltage selection module configured to power the conversion module and that includes a multi-pin connector and two or more receptacles, wherein each of the receptacles is coupled to different input taps of a control power transformer, wherein the multi-pin connector is configured to be coupled to one of the receptacles, and wherein the multi-pin connector and the two or more receptacles are configured to select the selectable voltage based on which of the two or more receptacles the multi-pin connector is coupled to,
- wherein coupling of the multi-pin connector to one of the receptacles establishes a connection between an input line of the inverter and a position of a resistor string associated with a selected voltage to provide resistance within a circuit of the inverter.

* * * * *

UNITED STATES PATENT AND TRADEMARK OFFICE
CERTIFICATE OF CORRECTION

PATENT NO. : 7,852,650 B2  
APPLICATION NO. : 11/872677  
DATED : December 14, 2010  
INVENTOR(S) : William Fillmore Taylor et al.

Page 1 of 1

It is certified that error appears in the above-identified patent and that said Letters Patent is hereby corrected as shown below:

In column 4, line 21, delete "6" and insert -- 6, --, therefor.

Signed and Sealed this

Twenty-sixth Day of April, 2011

David J. Kappos
*Director of the United States Patent and Trademark Office*